US008727370B2

(12) United States Patent
Tsai

(10) Patent No.: US 8,727,370 B2
(45) Date of Patent: May 20, 2014

(54) FOLDABLE STROLLER WITH ROTATABLE LEG REST ADAPTED FOR RECEIVING A CAR SEAT

(75) Inventor: Denny Tsai, Chino Hills, CA (US)

(73) Assignee: Baby Trend Inc., Ontario, CA (US)

( * ) Notice: Subject to any disclaimer, the term of this patent is extended or adjusted under 35 U.S.C. 154(b) by 270 days.

(21) Appl. No.: 13/106,765

(22) Filed: May 12, 2011

(65) Prior Publication Data

US 2012/0286497 A1    Nov. 15, 2012

(51) Int. Cl.
*B62B 9/12*    (2006.01)
*B62B 7/06*    (2006.01)

(52) U.S. Cl.
USPC ........... 280/648; 280/650; 280/658; 280/47.4

(58) Field of Classification Search
USPC ........... 280/31, 642, 643, 647, 648, 649, 650, 280/658, 47.38, 47.4
See application file for complete search history.

(56) References Cited

U.S. PATENT DOCUMENTS

| 4,946,180 | A | 8/1990 | Baer |
| 5,288,098 | A | 2/1994 | Shamie |
| 6,409,205 | B1 | 6/2002 | Bapst et al. |
| 6,478,327 | B1 | 11/2002 | Hartenstine et al. |
| 6,964,429 | B2 | 11/2005 | Suga et al. |
| 7,040,694 | B2 | 5/2006 | Sedlack |
| 7,513,512 | B2 * | 4/2009 | Yoshie et al. ............. 280/47.38 |
| 7,516,966 | B2 | 4/2009 | Gray |
| 7,600,775 | B2 * | 10/2009 | Chen et al. .................... 280/650 |
| D609,612 | S | 2/2010 | Chen et al. |
| 8,100,429 | B2 * | 1/2012 | Longenecker et al. ........ 280/642 |
| 8,256,792 | B2 * | 9/2012 | Conrad et al. ................. 280/648 |
| 8,382,127 | B2 * | 2/2013 | Longenecker et al. ...... 280/47.4 |
| 8,414,012 | B2 * | 4/2013 | Chen et al. .................... 280/648 |
| 2003/0080536 | A1 | 5/2003 | Hartenstine et al. |
| 2004/0124611 | A1 * | 7/2004 | Gong et al. .................... 280/642 |

(Continued)

FOREIGN PATENT DOCUMENTS

CA    2722153 A1    6/2011

OTHER PUBLICATIONS

International Search Report and Written Opinion in a counterpart PCT application No. PCT/US2012/037657, dated Jul. 27, 2012.

(Continued)

*Primary Examiner* — Katy M Ebner
*Assistant Examiner* — Emma K Frick
(74) *Attorney, Agent, or Firm* — Chen Yoshimura LLP

(57) ABSTRACT

A stroller with a leg rest that can be rotated to different positions, including an upward position in which the leg rest is adapted to be partially inserted into a notch of an infant car seat for secure placement of the car seat on the stroller. In one embodiment, the stroller frame is collapsible for storage, where a left side structure and a right side structure can be collapsed toward each other. The leg rest is formed of two individual members each attached to one of the left and right side structures. A gap exists between the two members when the stroller frame is in the uncollapsed state, allowing the two members to move toward each other when the stroller frame is collapsed, so that the leg rest does not need to be detached when collapsing the stroller frame. In another embodiment, the leg rest is a one-piece structure.

5 Claims, 6 Drawing Sheets

(56) References Cited

U.S. PATENT DOCUMENTS

| | | |
|---|---|---|
| 2004/0173997 A1 | 9/2004 | Voll |
| 2006/0131841 A1* | 6/2006 | Huang .................... 280/647 |
| 2009/0243260 A1 | 10/2009 | Longenecker et al. |
| 2009/0295128 A1 | 12/2009 | Nagelski et al. |
| 2010/0078916 A1 | 4/2010 | Chen |
| 2011/0175305 A1 | 7/2011 | Chen et al. |
| 2012/0193893 A1* | 8/2012 | Conrad et al. ............. 280/647 |

OTHER PUBLICATIONS

Bumbleride, "Indie Twin Operating Manual", www.bumbleride.com/pdf/2010-Indie-Twin-Manual.pdf, 34 pages, downloaded from the internet on Aug. 3, 2012.

Maclaren, "Twin Techno Instructions Manual" http://us.maclarenbaby.com/from-birth/twin-techno, 18 pages, downloaded from the internet on Aug. 3, 2012.

* cited by examiner

FOLDABLE STROLLER WITH ROTATABLE LEG REST ADAPTED FOR RECEIVING A CAR SEAT

BACKGROUND OF THE INVENTION

1. Field of the Invention

This invention relates to a baby stroller, and in particular, it relates to a baby stroller with a leg rest that rotates to different positions and is adapted to receive a car seat.

2. Description of the Related Art

There have been strollers designed to receive infant car seats. For example, U.S. Pat. No. 6,409,205 describes "A Child's stroller including a latch mechanism for convenient folding and unfolding of the stroller, a bolster/tray that pivotally mounts to the upper handlebars of the stroller and is adapted for receiving an infant carrier or car seat for convenient transport of an infant passenger thereof in the stroller. The latch mechanism utilizes a latching handle that pivotally engages a spring loaded collar for disengagement of the stroller frame." U.S. Pat. No. 6,478,327 describes a stroller which has "an infant carrier securing mechanism that allows the infant car carrier to be attached to the stroller and provide at least two tilt positions." U.S. Pat. No. 7,040,694 describes an infant car seat that "can be attached to and detached from a car seat base and a stroller. The stroller can be used with or without the infant car seat. The infant car seat connects to the stroller frame through a bar that supports a tray at the front of the stroller. The tray slides out of the way for car seat attachment." U.S. Pat. No. 4,946,180 describes "a child support apparatus for use as a safety car seat, stroller, highchair and crib. The apparatus has telescoping legs with retractable wheels and pivotable handles which may be extended to function as a stroller or retracted and pivoted to become a safety car seat. The apparatus has a restraining tray assembly adapted to receive a safety harness to provide an auxiliary safety feature that may be utilized if the harness is not fastened or accidentally comes loose from its normal male-female mating mechanism. The trays associated with the restraining tray assembly are adjustable and rotatable to provide access to the unit's seat or as an extension for the apparatus' side arms when the unit is used as a crib. The retractable wheels are adapted with telescoping legs which may be extended to allow the unit to function as a highchair." U.S. Pat. Appl. Pub. Nos. 20090295128, 20040173997 and 20030080536 also describe a stroller that can receive a car seat.

SUMMARY OF THE INVENTION

The present invention is directed to a baby stroller that has a leg rest in the front that can be folded up to receive an infant car seat.

An object of the present invention is to provide a stroller that can be used in conjunction with a car seat and is convenient and easy to use for the user.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a stroller which includes: a frame structure including a left side structure and a right side structure, the frame structure being collapsible as the left side structure and the right side structure collapse toward each other; and a leg rest having two individual members, each member being pivotally mounted on one of the left side and right side structures, the two members being separate from each other with a gap between them when the stroller is in an un-collapsed state, wherein the two members of the leg rest are rotatable around a rotation axis that extends horizontally and perpendicular to a moving direction of the stroller, wherein each member has a distal edge which is parallel to the rotation axis, and wherein when the two members are rotated around the rotation axis to an up position, the distal edges of the two members face upwards.

In another aspect, the present invention provides a stroller which includes: a frame structure; and a leg rest pivotally mounted on the frame structures, wherein the leg rest is rotatable around a rotation axis that extends horizontally and perpendicular to a moving direction of the stroller, wherein the leg rest has a distal edge which is parallel to the rotation axis, and wherein when the leg rest is rotated around the rotation axis to an up position, the distal edge faces upwards.

It is to be understood that both the foregoing general description and the following detailed description are exemplary and explanatory and are intended to provide further explanation of the invention as claimed.

DETAILED DESCRIPTION OF THE PREFERRED EMBODIMENTS

In addition to the strollers mentioned in the Background section above, commonly owned U.S. patent application Ser. No. 12/785,128 describes a baby stroller with a front tray that can be rotated down to receive a car seat.

A first embodiment of the present invention provides a baby stroller with a leg rest that can be rotated to different positions, including an upward position in which the leg rest is adapted to allow a car seat to be securely placed on the stroller. In particular, the leg rest is attached to the stroller frame at both ends, but is discontinuous in the middle, which facilitates folding of the stroller frame.

A second embodiment of the present invention provides a baby stroller with a leg rest that can be rotated to different positions, including an upward position in which the leg rest is adapted to allow a car seat to be securely placed on the stroller. Unlike in the first embodiment, the leg rest is a one-piece structure.

Figure 1:
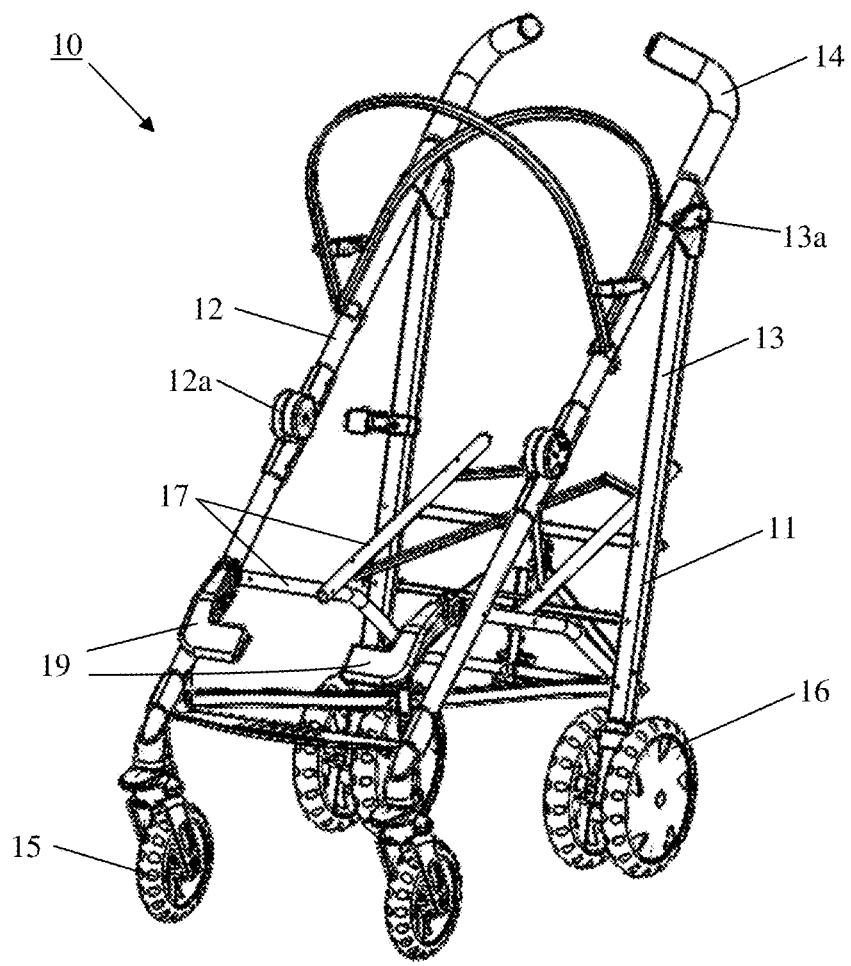
FIGS. 1-3 are perspective, right side and back views showing a stroller with a leg rest according to a first embodiment of the present invention.
Figure 2:
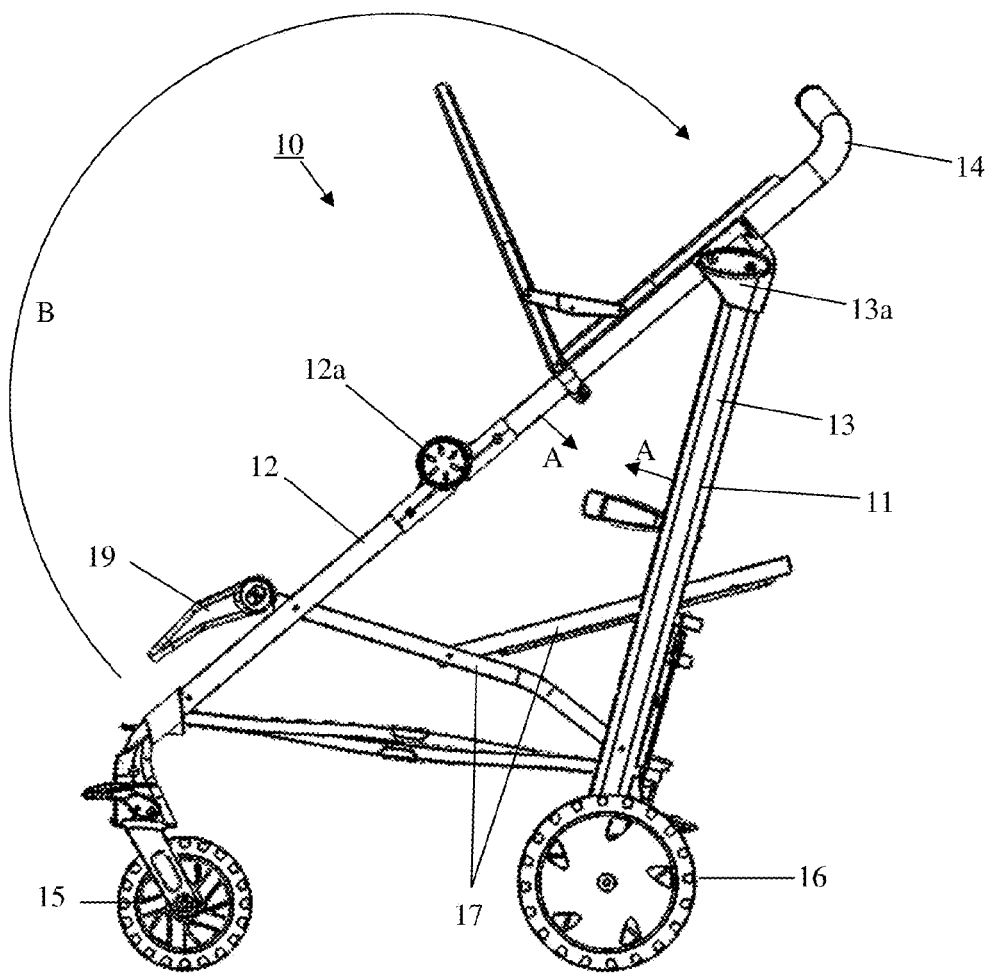
Figure 3:
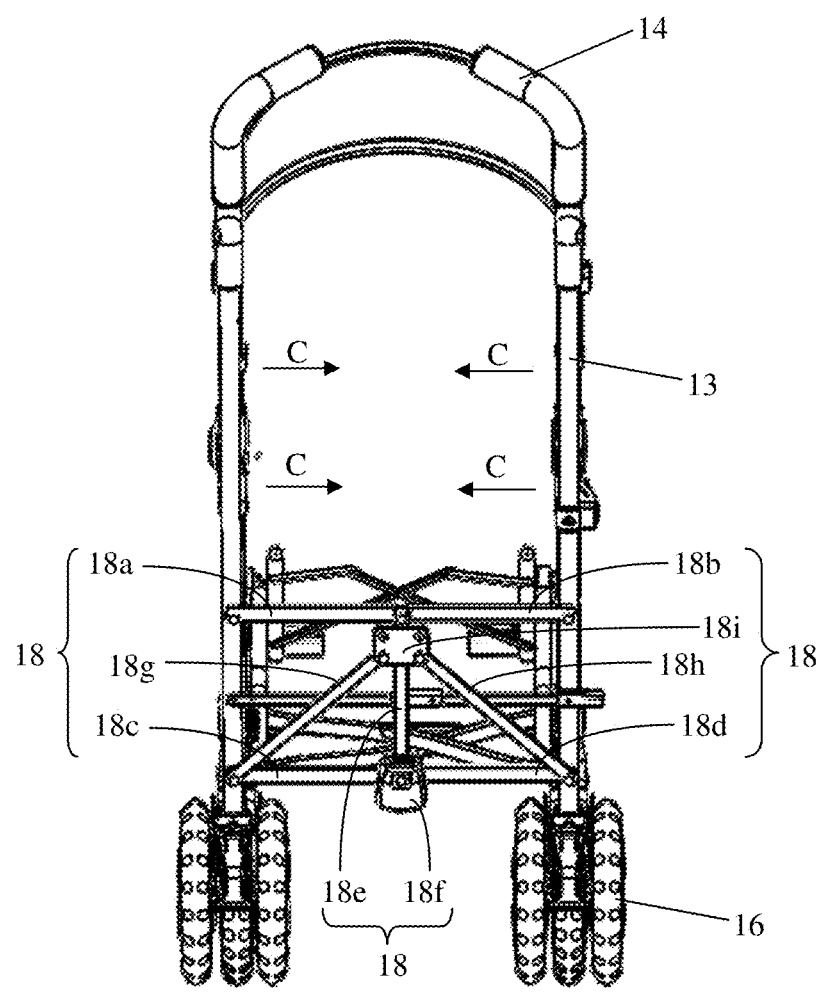

FIGS. 1-3 (perspective, right side and back views, respectively) illustrate a foldable stroller with a rotatable leg rest according to the first embodiment of the present invention. As shown in these figures, the stroller 10 has a frame structure 11 to support a seat (not shown) on which a child can be seated. The seat is preferably made of fabric materials attached to the frame structure 11. In the illustrated embodiment, the frame structure 11 includes a pair of slanted front bars 12 extending from an upper-rear location to a lower-front location of the stroller 10, and a pair of rear bars 13 extending substantially vertically from an upper-rear location to a lower-rear location. The bars may be formed of a tubular material or other suitable shapes. The front bar 12 and rear bar 13 on the same side (i.e., left side or right side) are joined together near the upper-rear location of the stroller. Push handles 14 are located near the upper-rear location; in the illustrated embodiment, the push handles are extensions of the front bars 12. A pair of front wheels 15 are mounted on the frame structure 11 at locations near the lower ends of the front bars 12, and a pair of rear wheels 16 are mounted on the frame structure 11 at locations near the lower ends of the rear bars 13. Additional bars 17 may be connected to the front bars 12 and/or rear bars 13 to provide support for the fabric seat.

The stroller frame structure 11 is foldable for storage. The front bar 12 and rear bar 13 on the same side are pivotally joined to each other near the upper-rear location by a hinge 13a, such that the front bar 12 and the rear bar 13 can pivot toward each other (as indicated by the arrows A in FIG. 2) when the stroller frame 11 is folded. Meanwhile, each of the front bars 12 is formed of two sections pivotally joined together by a hinge 12a, such that the lower segment of each front bar 12 (with the corresponding front wheel 15) can rotate upwards and then backwards around the hinge 12a (as indicated by the arrow B in FIG. 2) so that the front wheel 15 moves toward the handle 14 when the stroller frame 11 is folded.

In addition, the left and right sides of the stroller frame 11 can be collapsed toward a vertical center plane. In other words, the pair of front bars 12 move toward each other and the pair of rear bars 13 move toward each other when folded, as indicated by the arrows C in FIG. 3. As shown in FIG. 3, a locking structure 18 locks the pair of rear bars 13 in spaced-apart relationship when the frame structure 11 is in an extended state (i.e. the state for normal use, as shown in FIGS. 1 and 3), while allowing the two sides of the frame structure to be collapsed toward the center plane.

In the illustrated embodiment, the locking structure 18 includes a plurality of parts 18a-18f. A first and a second bar 18a and 18b are each pivotally connected to a corresponding rear bar 13 at one end and pivotally joined to each other at the other end. Likewise, a third and a fourth bar 18c and 18d are each pivotally connected to a corresponding rear bar 13 at one end and pivotally joined to each other at the other end. In the uncollapsed state, the first through fourth bars are horizontally disposed. A fifth bar (a center locking bar) 18e is vertically disposed and has a first end pivotally joined to the first and second bars 18a and 18b at the point where the first and second bars are joined, and a second end pivotally joined to the third and fourth bars 18c and 18d at the point where the third and fourth bars are joined. A releasable locking tab 18f locks the third through fifth bars 18c, 18d and 18e so that they cannot pivot with respect to each other. When the locking tab 18f is released, the center locking bar 18e (and/or the locking tab 18f) may be pushed upwards, causing the first and second bars 18a and 18b, and the third and fourth bars 18c and 18d, respectively, to form an upside-down V shape. This causes the two rear bars 13 to move toward each other to collapse the frame 11. When unfolding the stroller frame 11, the center locking bar 18e (and/or the locking tab 18f and/or the top ends of the first and second bars 18a and 18b) are pushed downwards, causing the two rear bars 13 to separate from each other. When the first through fourth bars 18a-18d are horizontal, the locking tab 18f can be locked.

For additional support, a sixth and a seventh bar 18g and 18h are each pivotally connected to a corresponding rear bar 13 at one end and pivotally joined to a sliding plate 18i at the other end. The sliding plate 18i is slideably disposed along the center locking bar 18e, and can slide along the center locking bar when the frame 11 is folded.

It should be noted that while the locking structure 18 is illustrated and described in detail, other locking structures may be used, as long as they can lock the left and right sides of the stroller frame into the spaced-apart relationship when the stroller is in use, and can be released (unlocked) to allow the left and right sides to collapse toward the center. The type of folding mechanisms for strollers described above have been known.

Figure 5:
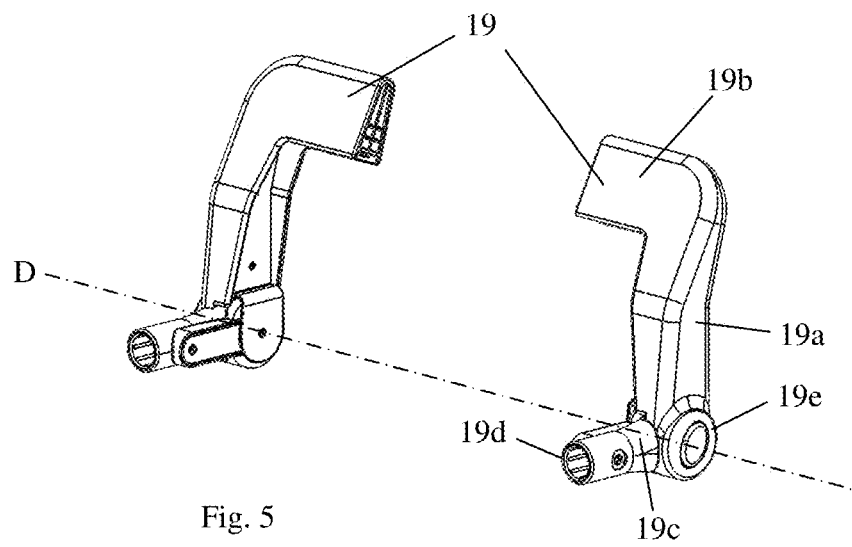
FIG. 5 illustrates the leg rest of the stroller of the first embodiment.

A leg rest 19 is pivotally mounted at the front of the frame structure 11, the mounting location being near the front edge of the fabric seat. The leg rest 19 may be mounted on the front bars 12, or on other bars that are attached to the front bars or other parts of the frame structure 11. The leg rest 19 is preferably made of plastic or other suitable materials. FIG. 5 is an enlarge view of the leg rest 19, viewed from the rear of the stroller. In this view, the leg rest is in the up position as will be described in more detail later.

Figure 4:
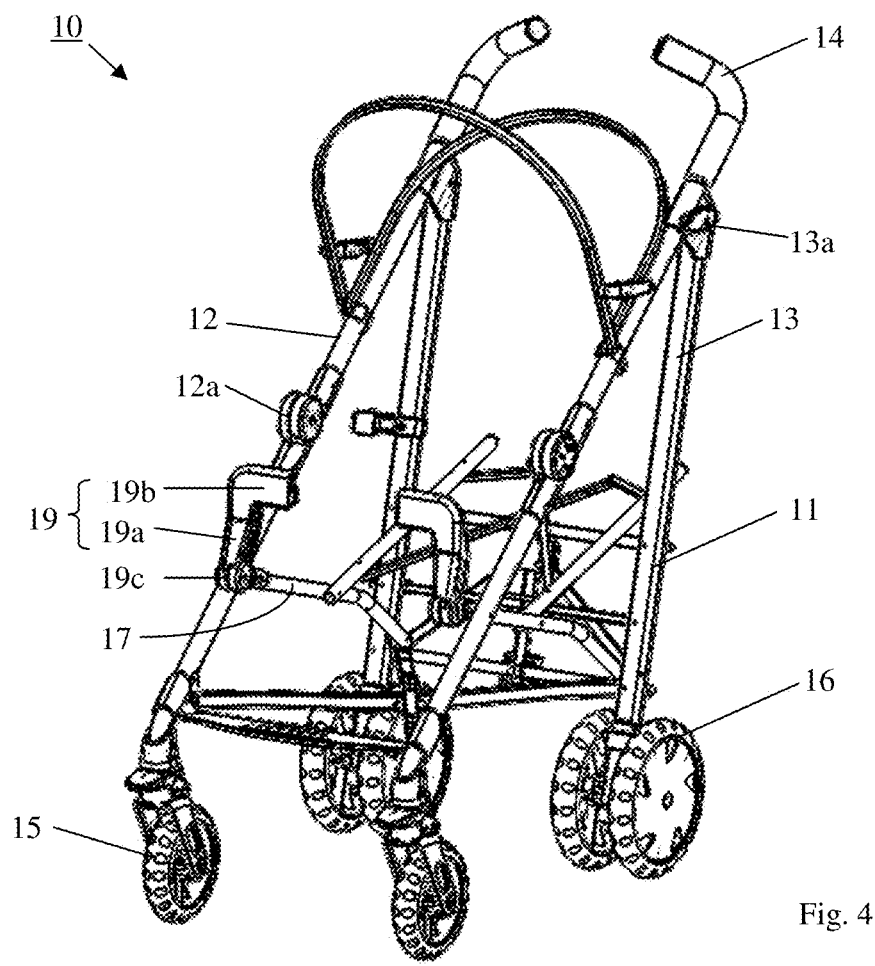
FIG. 4 is a perspective view of the stroller of the first embodiment with the leg rest rotated in an up position for receiving a car seat.

As shown in FIGS. 1, 4, and 5, the leg rest 19 is formed of two symmetrical L-shaped rigid members. Each individual L-shaped member includes a first segment 19a having a proximate end pivotally attached to a mounting member 19c, and a second horizontal segment 19b extending from the distal end of the first segment toward the center plane of the stroller frame. The horizontal segments 19b of the two L-shaped members are aligned with each other, forming a bar that is discontinuous in the middle.

In the illustrated embodiment, the mounting member 19c includes a tubular section 19d fitted onto a bar 17 which is in turn attached to the front bar 12 (see FIG. 4). The mounting member 19c also includes a locking mechanism to lock the L-shaped member when it is in a desired position to prevent it from rotating. The locking mechanism has a push button 19e on the outside of the L-shaped member to unlock it to allow the L-shaped member to rotate. The pivotal coupling between the first segment 19a and the mounting member 19c, as well as the locking mechanism, may be implemented by any suitable structures. Although details of these components are not illustrated here, one skilled in the art will be able to implement such coupling and locking structures without undue experimentation.

Figure 6:
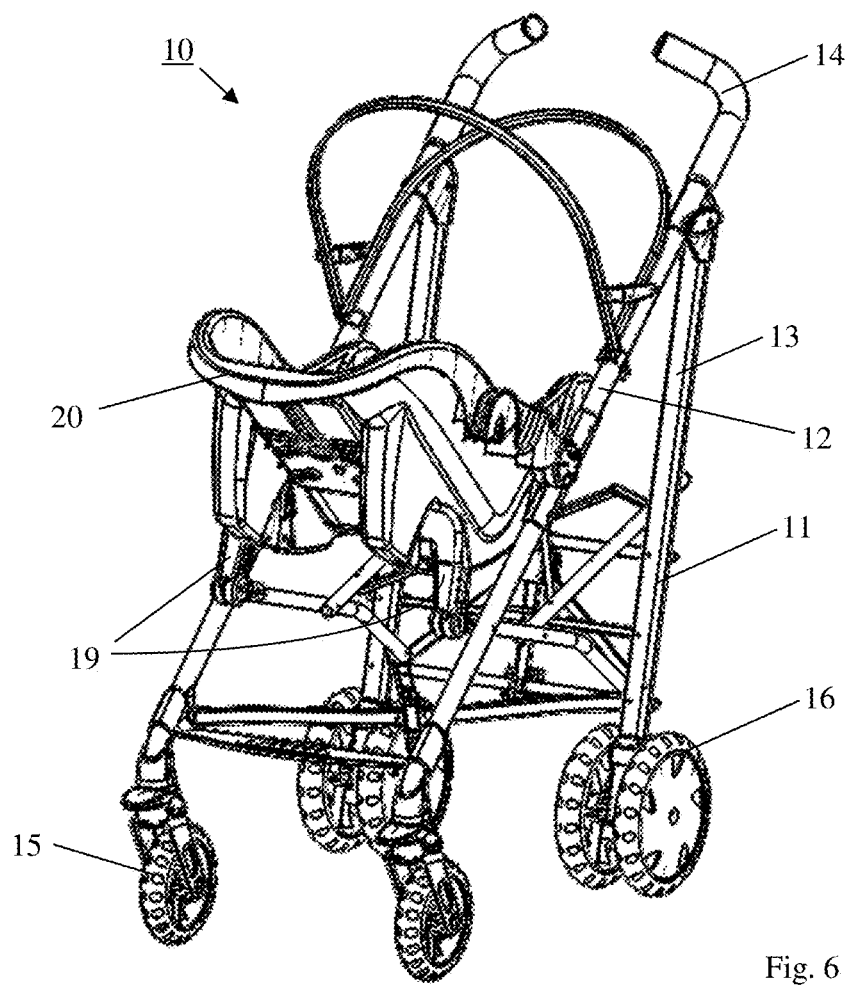
FIG. 6 illustrates the stroller of the first embodiment with an infant car seat resting on the leg rest when the leg rest is in the up position.

The leg rest 19 can rotate around a rotation axis D (see FIG. 5) which extends horizontally and perpendicular to the moving direction of the stroller. The leg rest 19 may be pivoted to three positions: a down position (see FIGS. 1 and 2) where the first segments 19a of the L-shaped members are substantially parallel to the front bars 12; a horizontal position (not shown in the drawings) where the first segments are substantially horizontal and parallel to the bottom of the fabric seat; and an up position (see FIGS. 4 and 6) where the first segments are substantially vertical and point upwards. In the up position, the leg rest is ready to receive a car seat. FIG. 6 illustrates a car seat 20 resting on the stroller 10 when the leg rest 19 is in the up position.

Figure 9:
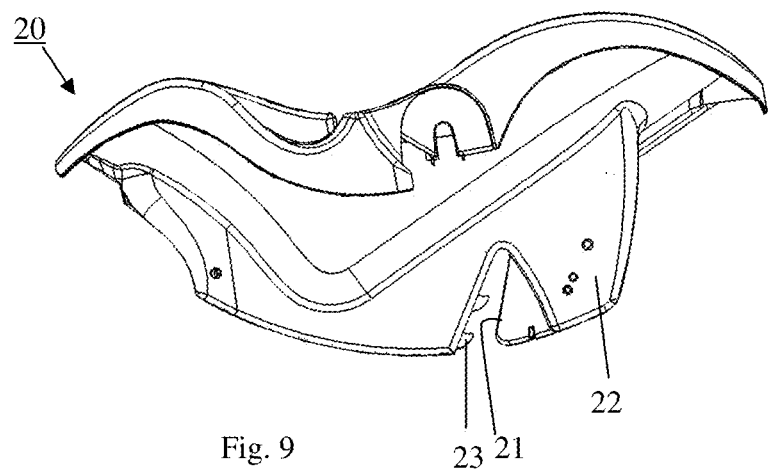
FIG. 9 is a side view of an infant car seat that can be used with the stroller of the first or second embodiment.

The car seat 20 is not a part of the stroller 10, but can be used in conjunction with the stroller for infants. FIG. 9 is a side view of an infant car seat 20. As shown in this figure, a support base 22 of the car seat 20 has an upward extending notch 21. The design of many existing infant car seats already provides such a notch to allow the car seat to be securely placed on top of a shopping cart, where a bar or other structure of the shopping cart would be inserted into the notch. In some car seats, one or more locking members 23 are provided in the notches 21 to allow the car seat 20 to be locked with the shopping cart. The locking members 23 can be released by release handle (not shown) on the car seat 20 to remove the car seat from the shopping cart. The design of such car seat, including the notches, the locking members and the release handle, is know in the art.

When the car seat 20 is used with the stroller 10, with the leg rest 19 in the up position, the horizontal segments 19b of the two L-shaped members are inserted into the notch 21, allowing the car seat to be securely placed on the stroller. The cross-sectional shape of the horizontal segments 19b (see FIG. 5) is preferably designed to fit the shape of the notch 20 of various car seats.

When the stroller 10 is used without a car seat, the two L-shaped members of the leg rest 19 are covered with a fabric material which extends across the entire width of the leg rest. Thus, the discontinuity of the leg rest 19 is concealed. Preferably, the fabric material covering the leg rest is joined to the fabric material that forms the seat of the stroller. When used without a car seat, the leg rest 19 is either in the down position, allowing the legs of the child to be bent and dangle, or in the horizontal position, allowing the legs to be straight and to rest on the leg rest.

To place a car seat on the stroller, the locking mechanism is released, the leg rest 19 is rotated to the up position and locked again, and the fabric cover of the leg rest is partially removed to expose the two horizontal segments 19b. The car seat 20 is then placed on the stroller 10 so that the horizontal segments 19b are partially or fully inserted into the notch 21.

As described earlier, when the stroller 10 is folded for storage, the two sides (left and right) of the frame 11 are collapsed toward each other. Because the leg rest 19 is discontinuous with a gap between the two individual members, the two L-shaped members can move toward each other along with the front bars 12 during folding. Had the leg rest been a continuous bar across the width of the stroller, one would have to detach at least one end of the leg rest from the frame before collapsing the stroller frame. By forming the leg rest 19 with a discontinuous bar, the stroller frame 11 can be collapsed toward the center without having to detach the leg rest.

A stroller according to the first embodiment of the present invention is described and shown in detail above. Many variations may be made in the structure of the stroller. For example, while a pair of front bars 12 and a pair of rear bars 13 are shown, other structures may be used for the stroller frame 11, as long as the frame has a left side structure and a right side structure that can be collapsed toward each other. The two individual members of the leg rest are mounted on the two side structures.

Further, while the two members of the leg rest are shown as being L-shaped, other shapes may be used, such as a rectangular shape, a triangular shape, etc. The main requirement for the shape of the two members is that each member has a distal edge (e.g. the top edge of the second segment 19b as illustrated in FIGS. 4 and 5) which is parallel to the rotation axis of the leg rest and has a cross-sectional shape that can fit into a notch of a car seat. When the leg rest is rotated to the up position, the distal edges of the two members face upwards.

Figure 7:
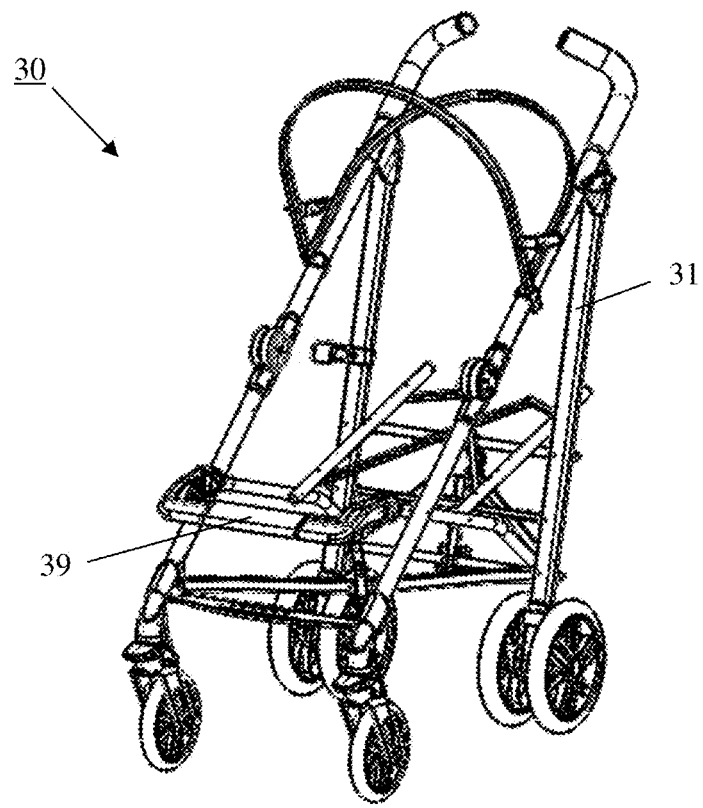
FIGS. 7 and 8 illustrate a stroller with a one-piece rotatable leg rest according to a second embodiment of the present invention.
Figure 8:
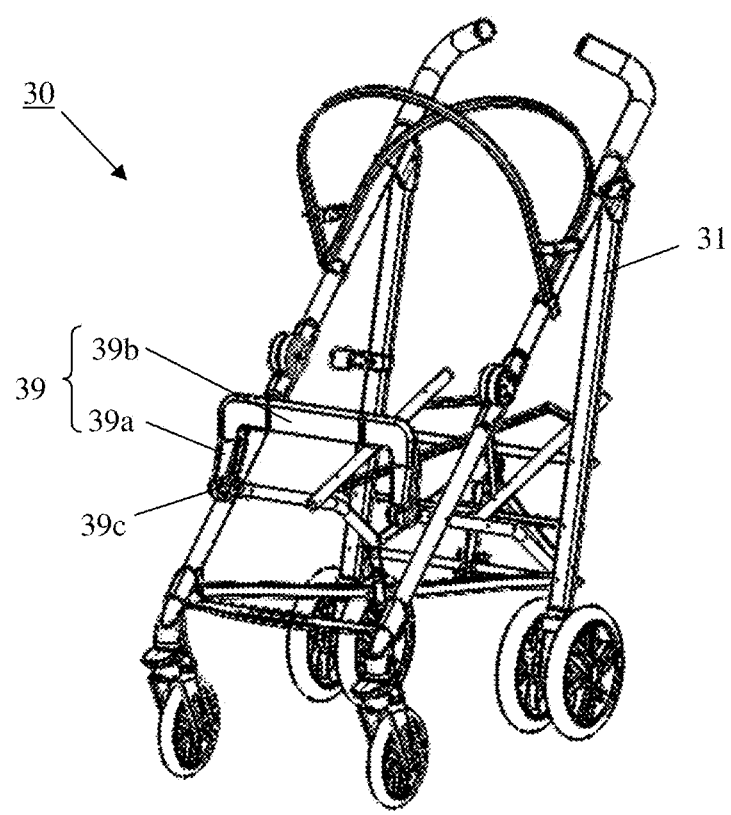

FIGS. 7 and 8 illustrate a stroller 30 according to a second embodiment of the present invention. The structure of the stroller 30 is generally similar to that of the stroller 10 of the first embodiment, but the leg rest 39 in the stroller 30 has a one-piece structure, instead of being formed of two individual members. The leg rest 39 includes two first segments 39a, each first segment having a proximate end pivotally attached to a mounting member 39c, and a second, horizontal segment 39b extending between the distal ends of the two first segments 39a.

The leg rest 39 is pivotally attached to the frame 31 of the stroller 30, similar to the way the two members 19 of the first embodiment are attached to the frame 11. Similar to the leg rest 19 of the first embodiment, the leg rest 39 of the second embodiment can rotate to a down position (see FIG. 7), a horizontal position and an up position (see FIG. 8). In the up position, the leg rest 39 allows a car seat to be securely placed on the stroller 30 with the horizontal segment 39b of the leg rest inserted into the notches of the car seat.

The leg rest 39 may be designed to have other shapes. For example, the leg rest may be a rectangular piece mounted at its two corners on the frame 31. The main requirement for the shape of the leg rest is that it has a distal edge (e.g. the top edge of the second segment 39b as illustrated in FIG. 8) which is parallel to the rotation axis of the leg rest and has a cross-sectional shape that can fit into a notch of a car seat. When the leg rest is rotated to the up position, the distal edges of the two members face upwards.

Due to the one-piece structure, the leg rest 39 does not allow the stroller 30 to be collapsed toward the center without detaching the leg rest. Thus, this leg rest design is suitable for strollers that do not collapse toward the center plane.

More generally, the stroller 30 has a frame structure (with or without being foldable or collapsible), and a leg rest pivotally attached to the frame structure. The leg rest is rotatable to an up position for securely receiving a car seat.

It will be apparent to those skilled in the art that various modification and variations can be made in the stroller with a rotatable leg rest of the present invention without departing from the spirit or scope of the invention. Thus, it is intended that the present invention cover modifications and variations that come within the scope of the appended claims and their equivalents.

What is claimed is:

1. A stroller comprising:
   a frame structure including a left side structure and a right side structure, the frame structure being collapsible as the left side structure and the right side structure collapse toward each other; and
   a leg rest having two individual members, each member being pivotally mounted on one of the left side and right side structures, the two members being separate from each other with a gap between them when the stroller is in an un-collapsed state,
   wherein the two members of the leg rest are rotatable around a rotation axis that extends horizontally and perpendicular to a moving direction of the stroller, wherein each member includes a mounting member attached to the frame structure, a first segment having a proximate end pivotally attached to the mounting member, a second segment extending horizontally from a distal end of the first segment toward a center plane of the stroller frame, wherein each second segment has an elongated cross-section taken in a plane perpendicular to the rotation axis with a distal edge which is parallel to the rotation axis, and wherein when the two members are rotated around the rotation axis to an up position, the first segments are substantially vertical and point upwards and the distal edges of the second segments face upwards.

2. The stroller of claim 1, wherein the two members of the leg rest are rotatable to a horizontal position where the distal edges of the two members are at a substantially same level as the rotation axis, and a down position where the distal edges of the two members are below the rotation axis.

3. The stroller of claim 1,
wherein each mounting member includes a releasable locking mechanism for releasably locking the respective member of the leg rest in the up position.

4. The stroller of claim 1, wherein the left side structure and the right structure each includes a front bar and a rear bar pivotally joined to each other.

5. The stroller of claim 1, wherein the frame structure further comprises a locking structure for locking the left side structure and the right side structure in spaced-apart relationship with respect to each other when the frame structure is in an uncollapsed state and allowing the left side structure and the and right side structure to be collapsed toward each other in a collapsed state.

\* \* \* \* \*